UNITED STATES PATENT OFFICE.

KARL WERNER SPALTEHOLZ, OF LEIPZIG, GERMANY.

MANUFACTURE OF TRANSPARENT AND TRANSLUCENT BODIES.

1,021,952.  Specification of Letters Patent.  Patented Apr. 2, 1912.

No Drawing.  Application filed April 8, 1909. Serial No. 488,663.

*To all whom it may concern:*

Be it known that I, KARL WERNER SPALTEHOLZ, a subject of the King of Saxony, residing at 9 Plagwitzerstrasse, Leipzig, Germany, have invented certain new and useful Improvements in the Manufacture of Transparent and Translucent Bodies; and I do hereby declare the following to be a full, clear, and exact description of the invention.

The subject matter of my invention is a method by means of which it is possible or more easy to inspect the structure or composition of bodies whether organic or inorganic.

There is a large number of bodies, the internal structure of which could not be sufficiently investigated heretofore because it was not possible to look into the composition of the body. The method of disintegrating the body could not, in most cases, give information with certainty, because on the one hand partial destruction was connected with the disintegration, and because, in addition, the disintegration could never be effected in all directions in such manner that the parts of the body could be followed and determined in their entire natural course. A connected picture of the entire structure of the body could not be obtained according to the methods employed heretofore. This defect was felt seriously particularly when investigating organic bodies, namely organized bodies from the entire animal and vegetable kingdoms. Precisely here was felt the need of most exact knowledge of the more or less complicated structure of these bodies. It is clear that organic bodies of this kind could never be known exactly in their structure with the aid of the known disintegrating method, because during the disintegration by cutting many parts are constantly destroyed, torn out of their connection, and even in the finest dissection or division could never be observed in their totality and in their reciprocal relations. The dissection facilitates or promotes the perception or knowledge of details, but more or less prevents the perception or knowledge of the entire arrangement.

By means of the present method, not only knowledge of details, but also knowledge of the relation of the details to the entire mass of the body and with it also knowledge of the entire structure of the body is promoted without it being necessary to disintegrate the body.

My method consists substantially in making the bodies in question transparent so far as possible or desired, and in this manner disclosing their structure to direct observation. This change in the bodies with respect to their optical behavior is brought about by the bodies being brought into connection with other bodies, preferably liquids, the refractive index of which is in a definite relation to the refractive index of the body to be observed or some of its individual parts. Numerous experiments and observations have shown that the best result is obtained when the refractive index of the body in question corresponds to that of the liquid with which it is brought into connection. Now most bodies, particularly organic bodies, such as animal or vegetable organs, are not uniform structures, but a mixture of tissues and the like which have no uniform refractive index. Therefore it has heretofore been considered impossible to make such organs, particularly when they are somewhat thick, transparent or translucent and visible in their internal structure. This is, however, likewise effected when these bodies are brought into connection with a liquid, the refractive index of which corresponds to the mean value of the refractive indices of the tissue or the like of the body in question.

In many instances only a better view into definite parts of the body is desired. In such a case a liquid is selected, the refractive index of which corresponds to that of the parts obstructing the view of the parts to be studied. In other instances liquids can be selected which, by virtue of their refractive index, cause definite parts or groups of parts of the body to disappear, as it were, and cause other parts to appear all the more distinctly.

The action of the above described method can be materially increased in many instances by removing from the bodies which are to be made transparent or translucent the parts which more or less prejudice the action of the liquid or the like which makes the bodies transparent. For this, different constituents of the bodies come into consideration. Such constituents may be present which, owing to their refractive index differing considerably from that of the principal mass of the body, prejudice the action of the liquid or prevent an intimate union of the liquid with the body and above all its penetration into the same. In organic bodies air, gases and water particularly come ito consideration in this respect.

Now it has been found that the best effect. i. e. the greatest transparency, is obtained when the bodies in question are impregnated completely with the liquid in question. The impregnation liquid must consequently not only penetrate into the fairly small and most minute, so-called ultramicroscopic, spaces between the elements of the body, but also into these last elements themselves. It follows from this that the greatest effect is obtained when the refractive index of the impregnating liquid or the like corresponds to the refractive index of these last elements. In order to obtain this greatest effect, in the case of tissues, constituents of tissues, and the like, the refractive index of the impregnating liquid will have to be selected equal to the refractive index of the tissue or constituent of the tissue which these have in a dry state, and further, the other constituents must be removed to as great an extent as possible. Consequently air, gases and particularly water would have to be removed to as great an extent as possible from the bodies because they prevent the impregnating liquid penetrating into the last elements of the bodies. In most organic bodies there is exceedingly high percentage of water. For example the human myocardium contains 80% of water.

As animal and human tissues have been examined heretofore only in the condition in which they are in the respective bodies, namely impregnated with the liquid of the tissue, it was never possible with the methods of investigation used heretofore to learn through the uninjured surface of the tissue the conditions which are present below, and consequently it was impossible to obtain a deep insight into many conditions of the internal structure of the bodies.

The method forming the subject-matter of my invention will be carried into practice somewhat differently according to the body which is to be treated in each instance, and also different liquids or the like will be employed. If it is a matter of making animal bodies transparent, these will be impregnated or filled up as completely as possible with a liquid, the refractive index of which corresponds either to the average value of the refractive indices of the different constituents of the tissue of the body in question or of the constituents of the body in a dry state, or to the refractive index of one of these constituents in a dry state. The refractive index of the body or its parts can be determined in any known manner and the liquid will then be selected or composed corresponding to this refractive index. An example of such a liquid, the refractive index of which corresponds to that of most animal tissue is a mixture of three parts of salicylic-acid-methyl-ester and one part of benzyl benzoate. The body in question is placed into this mixture and impregnated or filled with it as completely as possible.

If desired the body, before being impregnated, can be subjected to a preliminary treatment in order to remove any air, gases or water contained therein. For example, air and gases can be removed with the aid of an air-pump so that the impregnation takes place *in vacuo*. For removing water the body may be treated first with alcohol, benzol or the like. Such preparatory or preliminary treatments are known to those skilled in the art. As an example of a complete treatment including the preparatory treatment and the treatment of the present invention, I will give the steps for preparing a small animal according to the present invention. If the animal has fur or hair, these are removed, and it is then placed in a 50 per cent. solution of alcohol for forty-eight hours; thereupon in flowing water for twenty-four hours. After this it is preferably bleached with hydrogen peroxid for forty-eight hours. After this treatment it is preferably again placed in flowing water for twenty-four hours, then in successively stronger solutions of alcohol and water, running from 50 per cent. alcohol to pure alcohol. This treatment may last twenty-four hours. The body is then placed in benzol which is changed after twenty-four and forty-eight hours. The body may then be immersed in the liquid provided by my invention, let us say a mixture of oil of wintergreen and benzylbenzoate, and permitted to remain until thoroughly permeated by the liquid. This treatment is suitable for small animals, fish, shell fish such as crawfish, etc. In shell fish after the first treatment in alcohol and flowing water the shell should be decalcified in a solution of let us say 5 per cent. spirit of niter and then again treated with flowing water after which the process will proceed as before.

It will be understood that the preferred impregnating liquid provided by the invention does not mix with water and therefore any water contained in the body to be treated must be removed. But when impregnating materials which can mix with water or are soluble in it are employed and which can be caused to have a refractive index equal to that of the body, the removal of the water may be dispensed with if desired.

It is to be noted, that the object of this invention is to produce macroscopic preparations and not microscopic, and the invention is not intended to extend to the production of thin more or less transparent layers or sections.

I claim:

1. The method of rendering organic and inorganic bodies transparent or translucent without fine sub-division thereof, which consists in impregnating or filling up a body with a material, the refractive index of which corresponds as exactly as possible to that of the body.

2. The method of rendering organic and inorganic bodies composed of constituents having different refractive indices transparent or translucent without fine sub-division, which consists in impregnating or filling up a body with a material, the refractive index of which corresponds to the mean value of the refractive indices of the different constituents of the body.

3. The method of rendering one constituent of organic and inorganic bodies composed of constituents having different refractive indices transparent or translucent without fine sub-division, which consists in impregnating or filling up a body with a material, the refractive index of which corresponds to that of one constituent of the body.

4. The method of rendering some of the constituents of organic and inorganic bodies composed of constituents having different refractive indices transparent or translucent without fine sub-division, which consists in impregnating or filling up a body with a material, the refractive index of which corresponds to the mean value of the refractive indices of said first-named constituents of the body.

5. The method of rendering organic and inorganic bodies transparent or translucent without fine sub-division, which consists in impregnating or filling up a body with a material, the refractive index of which corresponds as exactly as possible to that of the dry body.

6. The method of rendering organic and inorganic bodies composed of constituents having different refractive indices transparent or translucent, which consists in impregnating or filling up a body with a material, the refractive index of which corresponds to the mean value of the refractive indices of the different constituents of the body when dry.

7. The method of rendering one constituent of organic and inorganic bodies composed of constituents having different refractive indices transparent or translucent without fine sub-division, which consists in impregnating or filling up a body with a material, the refractive index of which corresponds to that of one constituent of the body when dry.

8. The method of rendering the principal mass of organic and inorganic bodies transparent or translucent without fine sub-division, which consists in removing from the body which is to be treated those constituents, the refractive indices of which differ materially from the refractive index of the principal mass of the body, and in subsequently impregnating or filling up the remainder of the body with a material, the refractive index of which corresponds as exactly as possible to that of the remainder of the body.

9. The method of rendering the principal mass of organic and inorganic bodies transparent or translucent without fine sub-division, which consists in removing from the body which is to be treated those constituents which render difficult or prevent the impregnation or filling of the body with a material, the refractive index of which corresponds as exactly as possible to that of the remainder of the body, and in subsequently impregnating or filling up the remainder of the body with said material.

10. The method of rendering the solid parts of organic and inorganic bodies transparent or translucent without fine sub-division, which consists in removing gases and water from the body which is to be treated, and in subsequently impregnating or filling up the remainder of the body with a material, the refractive index of which corresponds as exactly as possible to that of the remainder of the body.

11. The method of rendering organic and inorganic bodies transparent or translucent without fine sub-division, which consists in impregnating or filling up a body with a liquid material, the refractive index of which corresponds as exactly as possible to that of the body.

12. The method of rendering organic and inorganic bodies containing a liquid transparent or translucent without fine sub-division of the body, which consists in impregnating or filling up a body with a material mixable with said liquid and the refractive index of which corresponds as exactly as possible to that of the body.

13. The method of rendering organic and inorganic bodies containing a liquid transparent or translucent without fine sub-division of the body, which consists in impregnating or filling up a body with a material soluble in said liquid and the refractive index of which corresponds as exactly as possible to that of the body.

14. The method of rendering parts of animal or human bodies transparent without fine sub-division thereof, which consists in removing the liquid from the tissue of said parts, and in subsequently impregnating or filling up the parts with a mixture of three parts of salicylic-acid-methyl-ester and one part of benzyl benzoate, substantially as described.

15. Organic and inorganic bodies in combination with a material, the refractive index of which corresponds to that of one constituent of the body, in which combination the body is transparent and translucent.

In testimony that I claim the foregoing as my invention, I have signed my name in presence of two subscribing witnesses.

KARL WERNER SPALTEHOLZ.

Witnesses:
CARL HERMANN,
RUDOLPH FRICKE.

Copies of this patent may be obtained for five cents each, by addressing the "Commissioner of Patents. Washington, D. C."